(No Model.)
C. E. WATKINS.
BROODER.
No. 483,409. Patented Sept. 27, 1892.
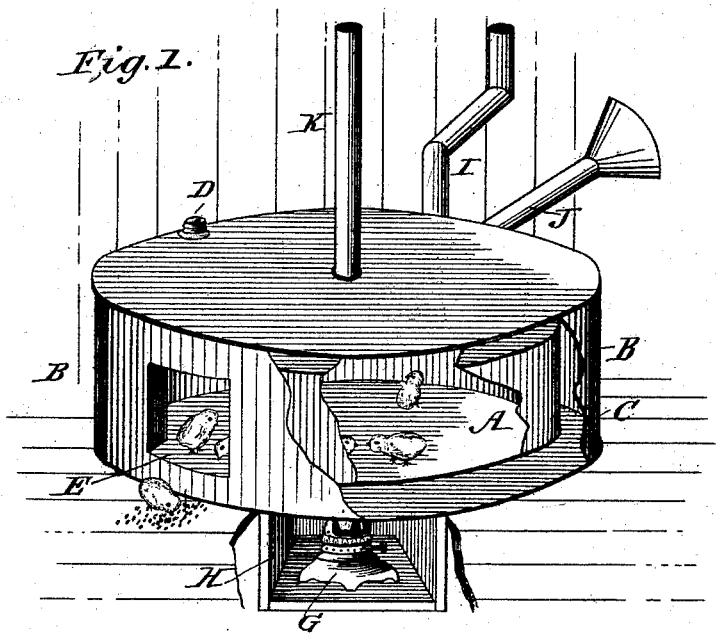
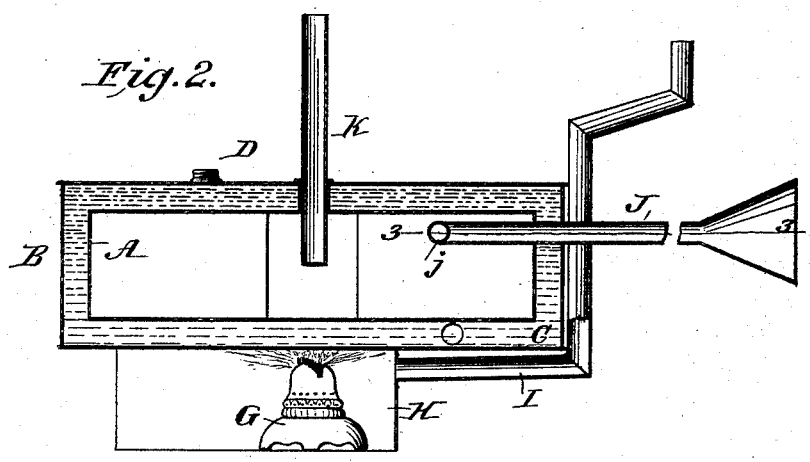
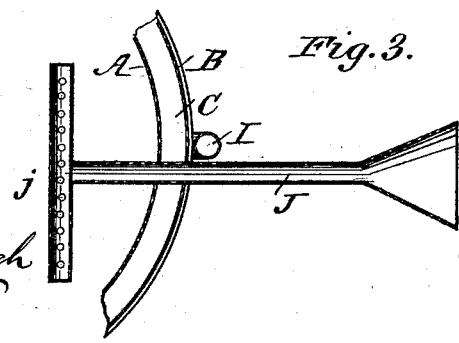
WITNESSES:
Fred G. Dieterich
P. B. Turpin
INVENTOR:
Chas. E. Watkins
BY
ATTORNEYS

UNITED STATES PATENT OFFICE.

CHARLES E. WATKINS, OF HARVARD, MASSACHUSETTS.

BROODER.

SPECIFICATION forming part of Letters Patent No. 483,409, dated September 27, 1892.

Application filed April 7, 1892. Serial No. 428,255. (No model.)

*To all whom it may concern:*

Be it known that I, CHARLES E. WATKINS, of Harvard, in the county of Worcester and State of Massachusetts, have invented a new and useful Improvement in Brooders, of which the following is a specification.

My invention is an improvement in brooders for chicks, and has for an object to provide a simple novel construction whereby the brooding-chamber will be heated on all sides, will be well ventilated, and in which there will be an equal distribution of heat throughout the brooding-chamber.

The invention consists in the novel constructions and combinations of parts, as will be hereinafter described, and pointed out in the claims.

In the drawings, Figure 1 is a perspective view, and Fig. 2 a vertical section, of my improved brooder; and Fig. 3 is a partial horizontal section on about line 3 3 of Fig. 2.

The brooder is shown as comprising the inner cylinder A, forming the brooding-chamber, and the casing B, surrounding said cylinder and separated therefrom by an intermediate space C, which in practice is filled with water. This space C extends above, below, and alongside the cylinder A, so that the water may circulate around and will equally heat such cylinder at all points. Water may be supplied to the space C through an inlet-opening D, which may be capped, as shown. A passage-way E extends across the space C and forms an inlet-opening to the brooding-chamber, enabling the chicks to pass into and out of the said chamber. This opening may be closed by a transparent door or curtain.

The brooder may be heated by the lamp G, placed in the compartment H below the main cylinder; but it is obvious that I do not desire in the broad features of my invention to be limited to the use of a lamp as the heating medium. The products of combustion from the lamp may pass off through the pipe I, which may extend into a chimney, if desired. Fresh air is admitted to the brooding-chamber through the pipe J, which in practice opens at its outer end into the fresh air and has at its inner end within the brooding-chamber a perforated branch *j*, so that the fresh air will be distributed in the said chamber. The pipe K conducts the foul air out of the brooding-chamber.

By forming the brooding-chamber round, as shown, there are no corners in which the chicks can huddle together, and they are thus prevented from crowding or huddling. By surrounding the brooding-chamber with water an equal distribution of heat is secured, which can be easily controlled by regulating the flame of the lamp. It will be seen that the temperature at the bottom of the brooding-chamber will be less than that above, so that there will be no loss of chicks from leg-weakness—a common source of difficulty in brooders.

The brooder may be used indoors or out. When used out of doors, it may be surrounded by a wire fence or cage to secure the chicks from being molested by cats, dogs, or other pests.

Having thus described my invention, what I claim as new, and desire to secure by Letters Patent, is—

1. An improved brooder comprising the brooding-chamber, the surrounding casing forming an intermediate water-space, the lamp-chamber below the casing, the offtake-pipe leading from said lamp-chamber, and the pipes for supplying air to and discharging it from the brooding-chamber, substantially as set forth.

2. In a brooder, the combination of the brooding-chamber, the outer casing, the lamp-chamber, the pipe I, leading from said chamber, the pipe J, having a branch *j* within the brooding-chamber, and the pipe K, all substantially as set forth.

3. The improved brooder, substantially as herein described and shown, consisting of the circular concentric brooding-chamber and casing, the chamber being arranged within and separated from the casing, forming a water-space, and both chamber and casing being water-tight, whereby water may be contained in the said intermediate space, means for heating the water in said space, an air-supply pipe leading to the brooding-chamber, and an air-discharge pipe leading from such chamber, substantially as set forth.

4. A brooder, substantially as described, comprising a water-tight inner or brooding chamber A, a water-tight casing B, surrounding the chamber A and separated therefrom, forming a communicating water-space above, below, and alongside the said chamber, a passage-way E, extended across said water-space and opening at its inner end into the brooding-chamber, the air-outlet pipe K, leading from the brooding-chamber, the air-inlet pipe leading to the brooding-chamber; the lamp-compartment below the casing, and the off-take-pipe leading from the said compartment, all substantially as and for the purposes set forth.

CHARLES E. WATKINS.

Witnesses:
LEVI WALLACE,
WARREN H. ATWOOD.